No. 667,804. Patented Feb. 12, 1901.
W. A. SWAREN.
COUNTING DEVICE.
(Application filed Nov. 9, 1899.)
(No Model.) 2 Sheets—Sheet 1.

WITNESSES.
Chas D. Justice.
Frank Hudson.

INVENTOR.
WILLIAM A. SWAREN.
By Atty.
N. DuBois.

No. 667,804. Patented Feb. 12, 1901.
W. A. SWAREN.
COUNTING DEVICE.
(Application filed Nov. 9, 1899.)
(No Model.) 2 Sheets—Sheet 2.
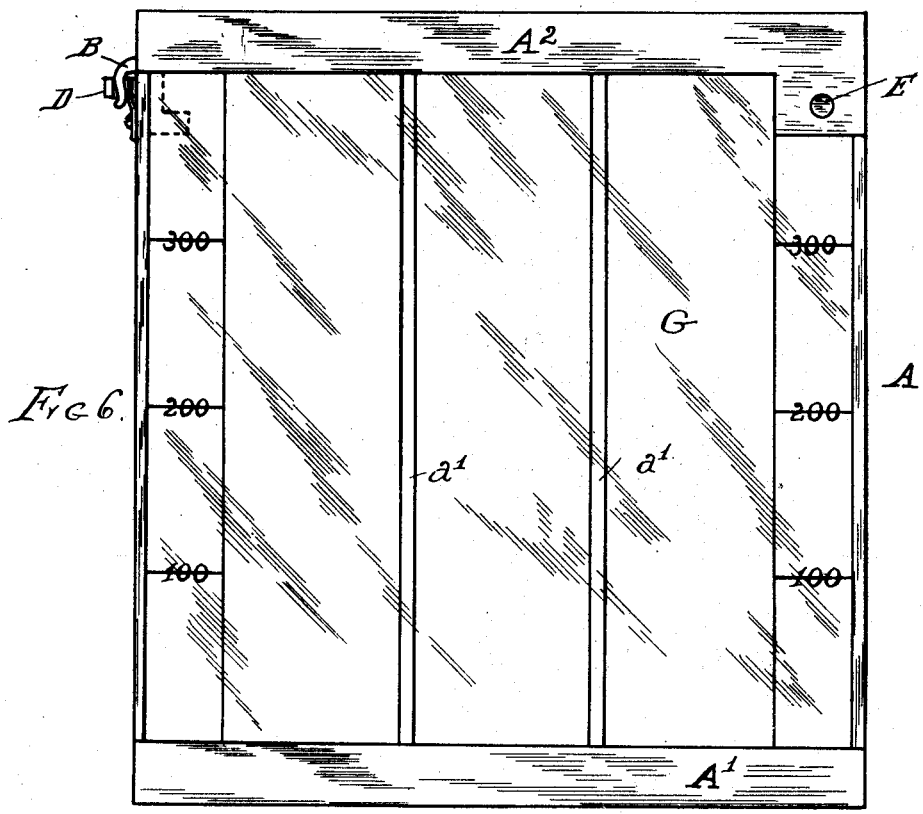
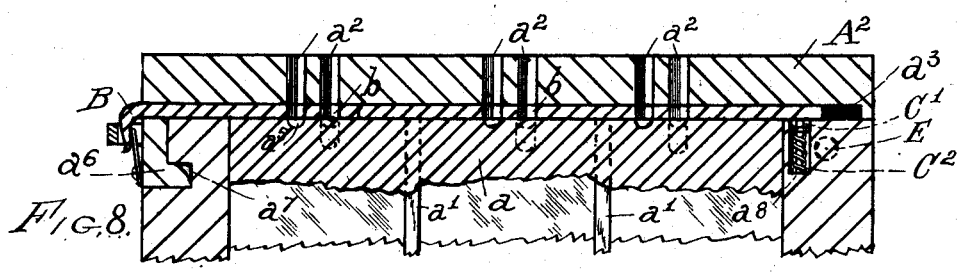
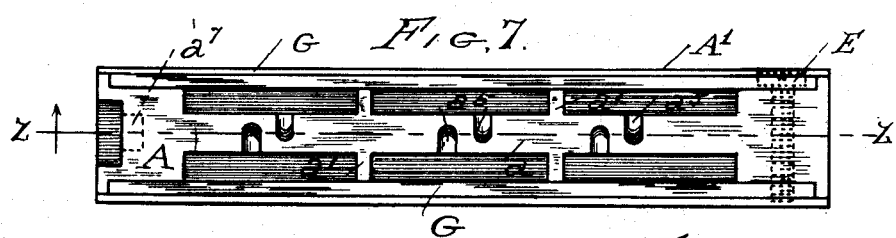
WITNESSES
Chas D. Justice
Frank Hudson
INVENTOR.
WILLIAM A. SWAREN
By Att'y. N. DuBow.

UNITED STATES PATENT OFFICE.

WILLIAM A. SWAREN, OF CHICAGO, ILLINOIS, ASSIGNOR OF ONE-HALF TO HAMILTON C. KIBBIE, OF OBLONG, ILLINOIS.

COUNTING DEVICE.

SPECIFICATION forming part of Letters Patent No. 667,804, dated February 12, 1901.

Application filed November 9, 1899. Serial No. 736,317. (No model.)

*To all whom it may concern:*

Be it known that I, WILLIAM A. SWAREN, a citizen of the United States, residing at No. 181 Dearborn avenue, in the city of Chicago, county of Cook, and State of Illinois, have invented certain new and useful Improvements in Counting Devices, of which the following is such a full, clear, and exact description as will enable others skilled in the art to which it appertains to make and use my said invention.

My invention relates to counting devices, such as are usable with voting-machines, weighing-machines, cash-registers, automatically-registering turnstiles, and other similar mechanisms which are employed to keep accurate count of numerical units, units of weight, value, measure, &c.

The purposes of my invention are to provide a counting device adapted to use balls to be deposited therein, each ball representing a single numerical unit or a single unit of weight, value, &c., said counting device having compartments of such internal dimensions that the balls deposited therein will when the box is shaken arrange themselves in rows, each full row containing the same predetermined number of balls, to provide a closure for controlling the deposit of balls in said counting device, to provide means for retaining the closure in position to permit the deposit of balls, to provide means for locking the closure in position to prevent the deposit or withdrawal of balls, to provide means for indicating the number of balls contained in each compartment of the counting device, and to provide means for sealing the counting device against unwarranted opening thereof.

With these ends in view my invention consists in the novel features of construction and combination of parts shown in the annexed drawings, to which reference is hereby made, and hereinafter described, and pointed out in the claims.

Figure 1:
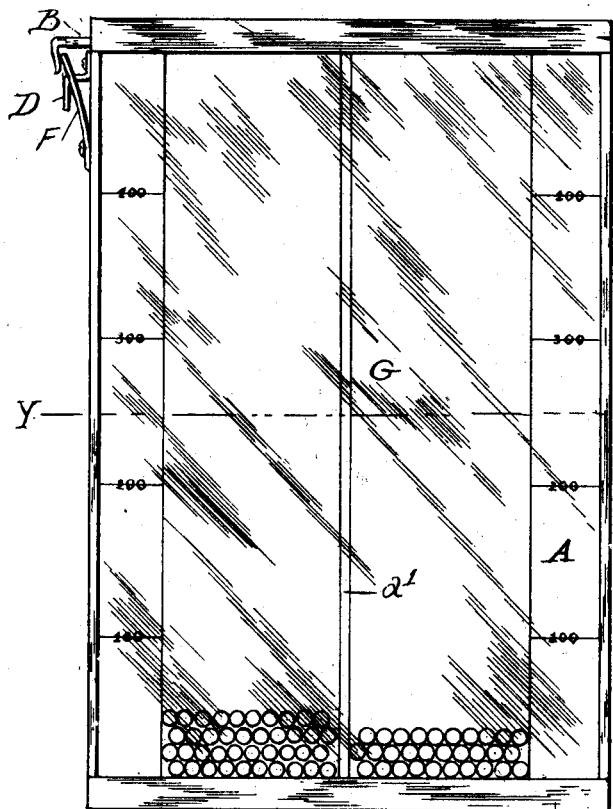
Figure 4:
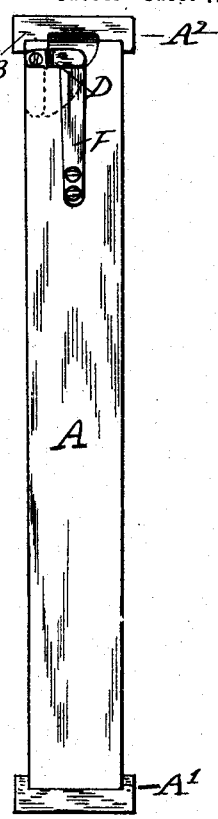
Figure 5:
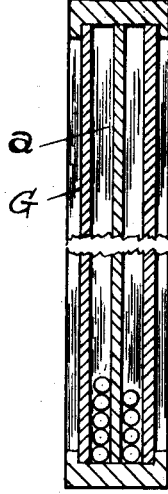
Figure 3:
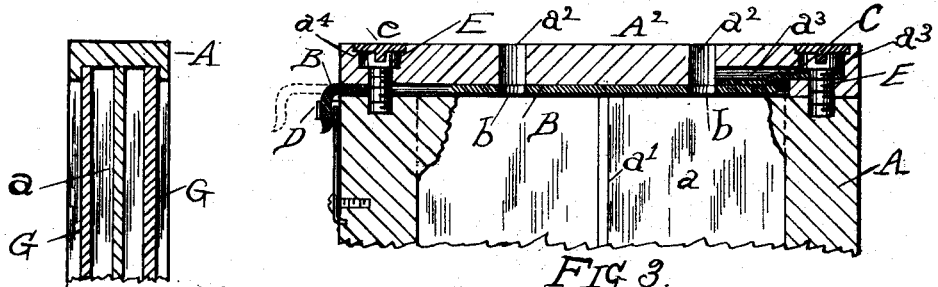
Figure 2:
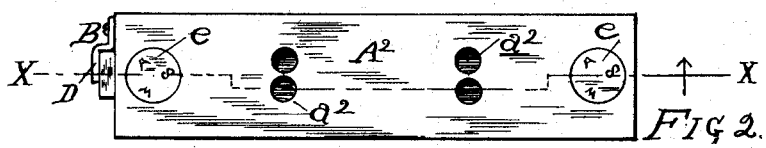

Referring to the drawings, Figure 1 is a front elevation of the counting device. Fig. 2 is a top plan view of same. Fig. 3 is a vertical partial longitudinal section on the line X X of Fig. 2. Fig. 4 is a side elevation. Fig. 5 is a horizontal transverse section on the line Y Y of Fig. 3. Fig. 6 is a side elevation of a modified form of my counting device. Fig. 7 is a top plan view of a device of the modified form, the cap $A^2$ being removed to show the underlying parts; and Fig. 8 is a partial vertical longitudinal section on the line Z Z of Fig. 7.

Similar letters of reference designate like parts in all of the views.

The main structure A is in the form of a rectangular box consisting of two divisions separated by an intervening partition $a$, so as to admit of ball-compartments on both sides of said partition. Each of these divisions is divided into compartments by longitudinal partitions $a'$.

In the drawings I have shown and I will hereinafter describe a counting device adapted to accommodate balls in rows of exactly ten balls in each row. The device may, however, be made to accommodate any other desired number of balls in a row without departing from my invention. In order that the compartments may accommodate exactly ten balls in each row, the width of each compartment is made exactly equal to ten times the diameter of one ball plus one-half the diameter of one ball, and for any other number of balls in a row the width of the compartment will be equal to the sum of the diameters of the balls in a row plus one-half the diameter of one ball. By giving the compartments just this width the balls will when the box is shaken dispose themselves in rows with the balls in each row above the bottom row lying in the interstices between the balls of the next underlying row, as clearly shown in Fig. 1 of the drawings.

The part A is supported on a suitable base $A'$ and is surmounted by a cap $A^2$, pierced by holes $a^2$, through which balls may be passed into the compartments. On the under side of the cap $A^2$ is a channel $a^3$, in which the slide B is slidable. The slide B is pierced by holes $b$, which register with the holes $a^2$ in the cap $A^2$. A spring C is secured in an enlargement of the channel $a^3$, and when the slide is pushed in the spring is compressed and overlaps the slide. When the slide is pulled out, as shown by dotted lines in Fig. 3, the slide closes the holes $a^2$, so that balls cannot be passed therethrough, and the slide being withdrawn from under the spring C the free end of the spring acts downward and comes to rest with the front end of the spring abutting against the rear end of the slide and locks the slide, so that it cannot be again pushed inward.

As a means for temporarily retaining the slide B in such position that the holes $b$ are in registry with the holes $a^2$ I employ a turn-button D or equivalent device, which engages with the downturned end $b'$ of the slide B to prevent outward movement of the slide, and when the button is released the spring F acts against the slide to push the slide outward. Any other suitable device may be used instead of the turn-button D without departing from my invention.

The cap $A^2$ is secured to body part A by screws E, sunk in holes $a^4$ in the cap, and the screws are sealed in place by seals $e$, of wax or other suitable sealing material, placed in the holes above the screw-heads in such manner that it will be impossible to remove the securing devices without destroying the seals.

Other suitable securing devices may be used without departing from my invention. For example, instead of employing two screws E and two seals $e$, as shown in Fig. 3, I may employ at one end of the cap $A^2$ a pin $a^6$, fitting in a hole $a^7$ in the side wall of the main structure, and at the other end a single screw E, extending transversely through the cap and the main structure and sealed by a single seal $e$, as shown in Fig. 7. It is only essential that the securing device shall not interfere with the movements of the slide and shall be detachable and sealable against unauthorized removal of the securing device or devices.

Instead of using the flat spring C for locking the slide B, I may without departing from my invention use any other equivalent device—such, for example, as the locking device shown in Fig. 8, which consists of a vertically-movable bolt $C'$, housed in a recess $a^8$ and acted against by a spring $C^2$. When the slide moves outward, the bolt moves upward behind the end of the slide and prevents inward movement of the slide.

On the faces of part A are graduations designated by numerals "100," "200," &c., which are so placed that when the balls F are in place in the compartments the graduations will indicate the number of balls in each compartment, as clearly shown in Fig. 1.

The fronts of the counting device have glass plates G, through which the balls and the graduations are visible.

In the modified form of the device illustrated in Figs. 6, 7, and 8 the partition $a$ is of such thickness that oppositely-inclined ways $a^5$ may be formed therein, through which balls may roll downward into the compartments below on the opposite sides of the partition. The ways $a^5$ are arranged in pairs in line with each other instead of in pairs side by side, as in the form of the device hereinbefore described. The holes $a^2$ in the cap $A^2$ are likewise arranged in pairs in line with each other and in registry with the inclined ways $a^5$. The slide B is pierced by the same number of holes $b$ as there are ways $a^5$. When the slide B is pushed in, the holes $a^2$, $b$, and $a^5$ are all in registry, as shown in Fig. 8.

Preparatory to using the counting device the person or persons in charge inspect each compartment to see that no balls remain therein. The slide B is then set with the holes $b$ in registry with the holes $a^2$. The cap $A^2$ is then secured to the body A by means of the securing devices E, and the seals $e$ are affixed. In practical use the counting device is placed in proper position in the machine or apparatus with which it is to be used, with the slide B in such position that the holes $b$ are in registry with the holes $a^2$, and during the use of the counting device the slide B is kept in that position either by the button D or by any equivalent device in connection with the machine or apparatus with which the counting device is used. The balls representing units to be counted are deposited either by hand or by mechanical means through the holes $a^2$ and $b$ into the compartments, in which they arrange themselves in rows of ten balls in a row, as shown, and a glance at the graduations suffices to show the number of balls in each of the compartments.

In the counting device I have shown a multiplicity of compartments, adapting the device to keep separate count of a multiplicity of different units. For example, if used in a voting-machine each compartment may receive balls representing units relating to separate offices for which there are a multiplicity of candidates to be voted for, or if used in a cash-register separate compartments may receive balls representing units of different values, as dimes, dollars, &c., and so on for the various uses for which the counting device may be employed. I have also shown and described a closure adapted to simultaneously cover or uncover all of the openings through the cap.

Having fully described my invention, what I claim as new, and desire to secure by Letters Patent, is—

1. In a counting device, the combination of a main structure having compartments, a cap connected with the main structure and having openings communicating with the compartments therein, a movable closure having openings registering with the openings in said cap, a retaining device holding said closure with the openings therethrough in registry with the openings in said cap, means for automatically moving said closure upon the release of said retaining device and means for automatically locking said closure, as set forth.

2. In a counting device, the combination of a main structure having compartments, a cap connected with the main structure and having openings communicating with the compartments therein, a closure movable in said cap, a spring acting against said closure to move same and a spring acting against said closure to lock same, as set forth.

3. In a counting device, a main structure having a central division and partitions forming compartments on both sides of said division, in combination with a cap fitting on the main structure and having openings communicating with said compartments respectively, a slide movable in said cap and having openings registering with the openings in said cap respectively, and a locking device engaging with said slide, as set forth.

4. In a counting device, the combination of a main structure having compartments, a cap fitting on the main structure, and having openings communicating with said compartments therein, securing devices connecting the cap with the main structure, seals sealing said securing devices, a slide slidable in said cap and having openings registering with the openings in said cap, a turn-button engaging with said slide, a spring acting against said slide to push it outward, and a spring acting against the slide to lock same, as set forth.

5. In a counting device, the combination of a main structure having a central partition provided with oppositely-inclined ways, a cap having holes in registry with said ways and a closure having holes registering with said ways and slidable to simultaneously cover all of said holes and said ways, as set forth.

6. In a counting device, the combination of a cap provided with a pin, a main structure having a hole in which said pin fits, and a securing device connecting said cap with the main structure and a seal sealing said securing device, as set forth.

7. In a counting device the combination of a main structure having a compartment adapted to contain a multiplicity of rows of balls, the width of said compartment being equal to the sum of the diameters of the balls contained in a row plus one-half the diameter of one ball, also having a transparent front and graduations, also having an opening through which balls may be deposited in said compartment; in combination with a closure adapted to close said opening, as set forth.

In witness whereof I have hereunto subscribed my name, at Chicago, Illinois, this 30th day of October, 1899.

WILLIAM A. SWAREN.

Witnesses:
 B. G. SEELYE,
 ANNIE B. SEELYE.